United States Patent Office 3,197,881
Patented Aug. 3, 1965

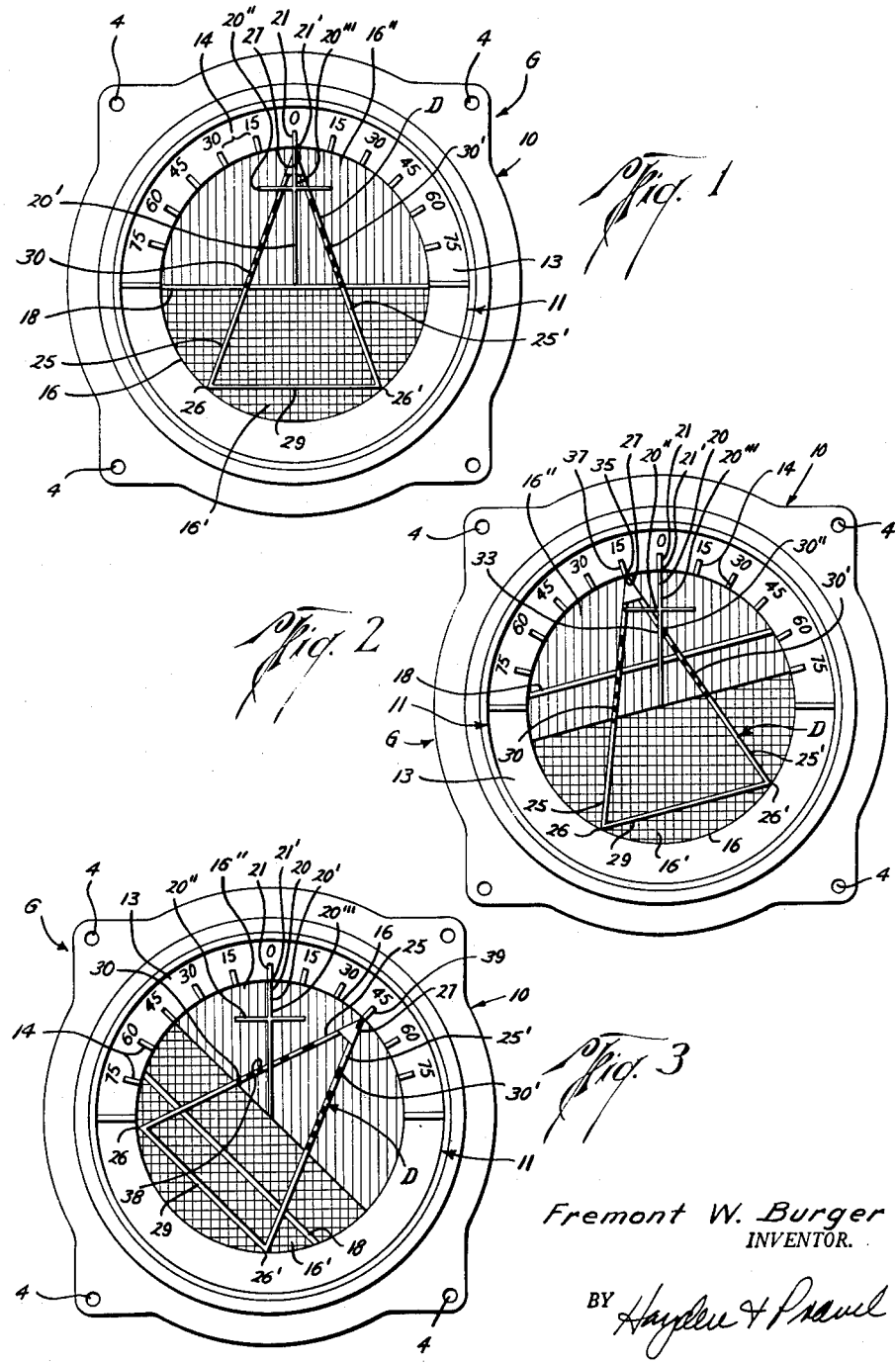

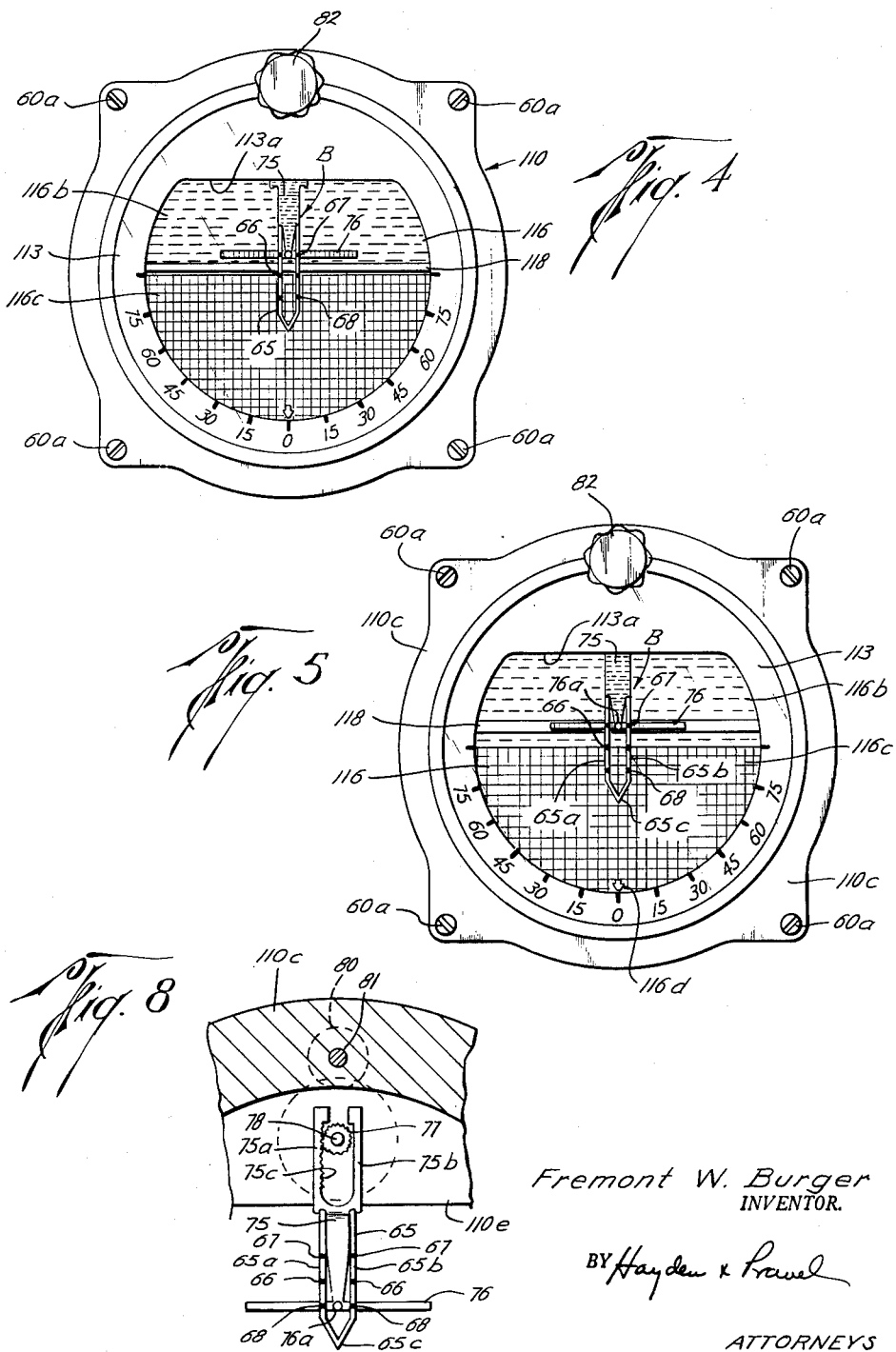

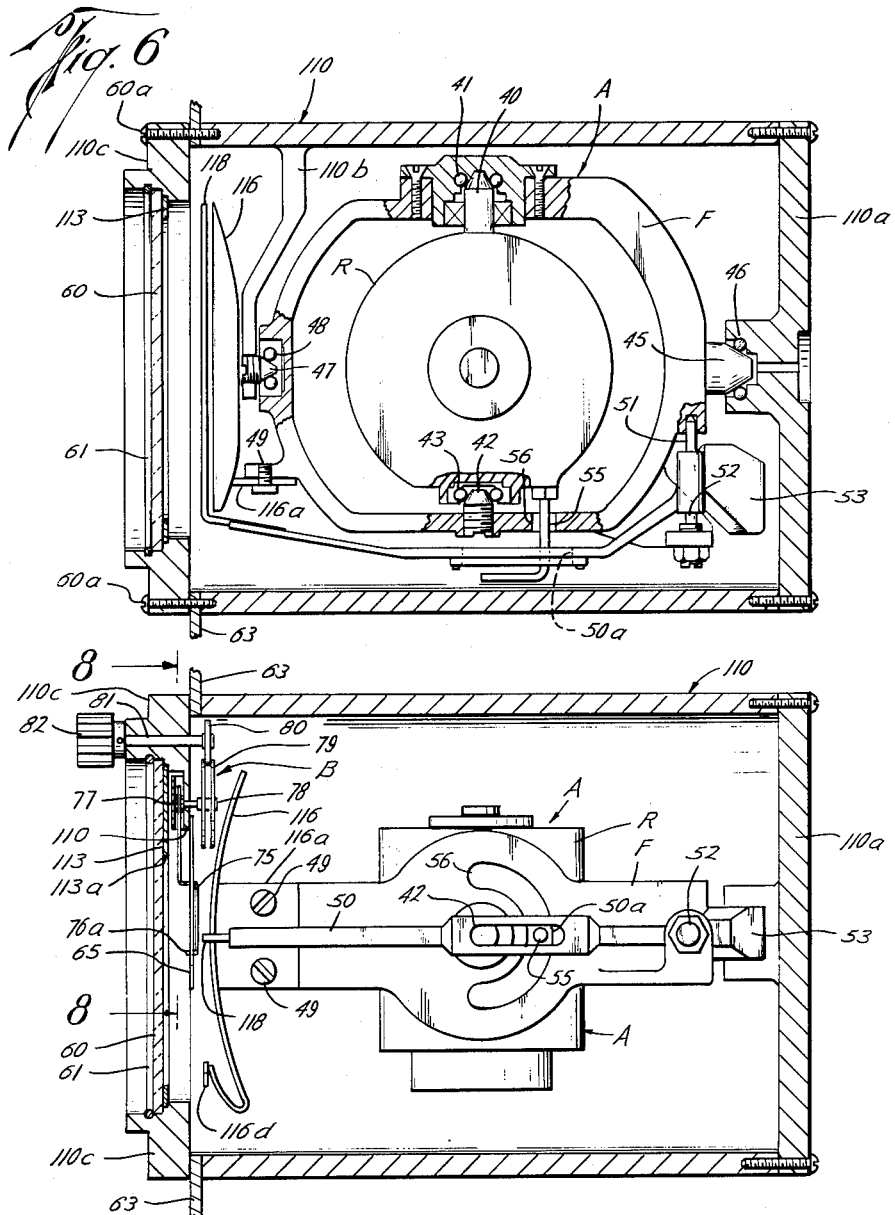

1

3,197,881
GYROSCOPIC PRESENTATION
Fremont W. Burger, P.O. Box 26325, Houston, Tex.
Filed July 13, 1961, Ser. No. 124,313
3 Claims. (Cl. 33—204)

This is a continuation-in-part of my prior copending patent application Serial No. 820,371, filed June 15, 1959, now abandoned.

This invention relates to a new and improved means of gyroscopic presentation.

The present invention relates primarily to a gyroscopic presentation for use in aircraft, and for illustrative purposes only the description and application in the specification will be directed thereto; however, this is in nowise intended to limit the scope of the invention.

Gyro horizons or artificial horizons have been used in aircraft for a number of years. Such an instrument utilizes a gyroscope and is designed to furnish a surface constantly prependicular to the vertical and therefore parallel to the horizon. Some gyro horizons have their gyroscopes powered by air and other s by electricity; and any suitable form of energy may be used.

The gyro horizon indicates the position of the aircraft, within which it is mounted, in relation to the earth's surface or horizon. The roll (right or left bank) and pitch (whether climbing or descending) of the aircraft are also indicated to the pilot.

Modern aircraft are also equipped with one or more compasses, which may be of either the magnetic or gyro type or both, for indicating directional movement of the aircraft.

The pilot of the aircraft must therefore constantly refer to both the compass and the gyro horizon in order to maintain his aircraft on the proper or desired course and in proper position or attitude.

It is therefore an important object of the present invention to provide a new and improved means of gyroscopic presentation whereby directional movement is indicated on a gyro horizon or attitude instrument.

One type of gyro horizon currently being marketed has a housing including a circular face thereon, the face including a ring thereon such ring having indicator marks thereon which are generally 30° apart and extend circumferentially around the upper half of the ring from nine o'clock to three o'clock. These marks have no designations, but the ones positioned at nine, twelve and three o'clock are usually heavier or more pronounced. The indicator ring moves with the housing of the gyro which in turn moves with the aircraft, being in fixed relationship therewith.

A bar connected to the gyroscope is positioned across the face of the gyro horizon instrument so that when the aircraft is parallel to the earth's surface the bar is positioned across the face of the gyro from nine o'clock to three o'clock, all in a manner well known in the art. This horizontal bar simulates the earth's horizon.

A second horizontal bar usually having a cutaway portion in the center so as to distinguish it from the bar indicating the horizon is mounted on the housing of the gyro an can be moved vertically over the face of the gyro manually by the pilot by means of a knob or dial located at six o'clock on the gyro horizon. This indicator bar simulates the aircraft.

2

The basic presentation described above is generally found in all gyro horizons. Including the above presentation, there of course may be internal variations; e.g., one type of gyro horizon may have its gyroscope enclosed in a sphere or ball, which ball can be fully seen in the face of the gyro and is normally black. This sphere or ball moves in direct relationship with the gyroscope of the instrument. Another modification may have the gyroscope exposed in the housing with a plate or covering hiding it from view. Such plate or covering is attached to the gyroscope roll gimbal so as to move with it in only one plane in a manner well known in the art. This plate is generally black in color and when viewed from within the aircraft appears to move clockwise or counterclockwise and has no vertical movement.

Another object of the present invention is to provide a new and improved presentation of a gyro horizon whereby the marks indicating degrees are numerically designated.

Still another object of the present invention is to provide a new and improved means of gyro presentation whereby one half of the sphere or ball of the gyroscope in a gyro horizon is black and the other half is of a different color, preferably one that is readily distinguished from the other by normal vision.

Another important object of the present invention is to provide a new and improved means for indicating directional movement on a gyro horizon whereby such means consists of a pair of diverging arms, meeting at a point and mounted on the gyroscope so as to be positioned therewith.

Another object of the present invention is to provide a new and improved means of gyroscopic presentation wherein a cross is fixed to the face of the housing of the gyro instrument with the body of the cross extending downwardly and vertically from twelve o'clock or zero degrees, and with the cross arm fixed in the usual or well-known position.

Yet a further object of the present invention is to provide a new and improved gyroscope horizon whereby the degree of roll is accurately measured.

Still a further object of the present invention is to provide a new and improved gyro horizon wherein the degree of roll is indicated on a pair of diverging arms meeting each other at a point.

Another object of the invention is to provide a new and improved indicator means for setting and indicating maximum climb and glide conditions of flight in an aircraft.

A further object of this invention is to provide a new and improved apparatus for visually indicating the angle of bank of an aircraft in a modified presentation which is extremely simple and easy to read.

It is difficult for a pilot to maintain directional control of his aircraft when ascending, descending, or banking either to the left or right, but with this invention, directional control of the aircraft is assured.

The present invention overcomes these defects in prior art gyroscopic presentations.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIG. 1 is an elevation of the gyroscopic presentation of this invention as it would appear in an aircraft in horizontal flight;

FIG. 2 is an elevation of the gyroscopic presentation of this invention as it would appear in an aircraft descending and in fifteen degrees right bank;

FIG. 3 is an elevation of the gyroscopic presentation of this invention as it would appear in an aircraft ascending and banking forty-five degrees to the left;

FIG. 4 is an elevation of a modified gyroscopic presentation of this invention as it would appear in an aircraft which is descending but which has not reached its maximum safe descending attitude;

FIG. 5 is a view similar to FIG. 4, except that it illustrates the gyroscopic presentation when the aircraft has reached its maximum safe descent position or pitch in flight;

FIG. 6 is a view, partly in plan and partly in section, illustrating one type of gyro mechanism adapted to be connected with the gyroscopic presentation apparatus of this invention;

FIG. 7 is a view, partly in elevation and partly in section, illustrating the apparatus shown in FIG. 6 from another direction; and FIG. 8 is a view taken on line 8—8 of FIG. 7 and it illustrates further details of the means for setting the maximum safe climb and glide attitudes.

In the drawings the gyro presentation is designated generally as G. The face 11 of the gyro presentation G is suitably enclosed in a housing 10 which housing is mounted on the instrument panel of an aircraft in a manner well known in the art. Appropriate holes or openings 4 are located in the four corners of the housing 10 for this purpose. The face 11 includes a ring 13, such ring having a plurality of calibrations or marks 14 thereon its top half indicating degrees from zero degrees to ninety degrees in each upper quadrant. As illustrated in the drawings the ring is marked in fifteen degree intervals but any interval may be used without departing from the scope of the invention. Intervals of seven and one half degrees are not uncommon.

The plate 16 of the gyroscope (not shown) is illustrated as having its lower half 16' black and its upper half 16" pink. It can readily be seen that the plate 16 could be any combination of colors as long as the colors are suitably contrasting.

Extending horizontally across the face 11 is a bar 18. When the aircraft is in level flight in relation to the earth's surface the bar 18 extends horizontally across the face 11 and the plate 16 so as to divide the face and plate into two equal parts such as 16' and 16" shown in FIG. 1. This horizontal bar 18 simulates the position of the earth's horizon.

Rigidly fixed to the face 11 (and preferably under the transparent protective cover normally used in gyro horizon construction) is a cross 20 positioned in such manner that the body member 20' of the cross 20 extends from the lower end 21' of the zero degree mark 21 down to the horizontal reference line which coincides with the horizontal bar 18 (when such bar is in position indicating level flight) so as to divide the top half of the face into two equal quadrants. A cross arm 20" is positioned across the upper portion 20''' of the body 20' of the cross 20. This cross simulates the aircraft within which the device of this invention is mounted.

Attached to the gyroscope by any suitable means are a pair of diverging arms 25 and 25' meeting together at their uppermost parts as shown at 27 adjacent the calibrations 14. For additional rigidity the arms 25 and 25' may be joined together at their lowermost ends 26 and 26' by a bar or arm 29. These arms 25, 25' and 26 form a means designated generally as D for indicating the direction and degree of movement of the aircraft as it rolls or banks. The indicator D is positioned on the face 11 so as to move clockwise or counterclockwise with the plate 16 as can be seen in FIG. 2 and FIG. 3.

The arms 25 and 25' have a plurality of marks 30 and 30' extending downwardly from the apex 27 in spaced relation to each other. Such marks 30 and 30' are spaced apart to give an additional reading of degrees right or left and such marks 30 and 30' correspond to the degree marks 14 circumferentially spaced around the ring 13. The mark 30' crossing the cross body 20' indicates the degree of roll of the aircraft to the right. For example and referring to FIG. 2 it can be seen that the uppermost mark 30" (also the first mark counting from the top down) on the arm 25' crosses the body 20' of the cross 20. This point 33 of cross 20 indicates fifteen degrees right bank corresponding to the indication at 35 where the apex 27 points to the mark 37 indicating fifteen degrees right bank. Each successive mark 30' on the arm 25' represents an increment of fifteen degrees corresponding to the increments of degree shown circumferentially on the ring 13.

This secondary system of indicating roll of the aircraft is further illustrated in FIG. 3. The third mark 38 (counting from the top down) of the arm 25 across the body 20' to the cross 20. As this is the third increment and the increments represent fifteen degrees each, the indicator D shows a left bank or roll of forty-five degrees. This can be further seen in that the apex 27 of the indicator D is also pointing to the circumferential mark 39 designated forty-five degrees.

The gyroscopic presentation of this invention indicates roll, pitch and directional movement of the aircraft. In the operation of the invention the pilot of an aircraft in flight sets his course of flight in a manner well known in the art. Once on correct course the gyro presentation of this invention will indicate whether or not that course is being maintained. The apex or pointer 27 is held steady at zero degrees and with the horizontal bar 18 indicating level flight as shown in FIG. 1 the aircraft is on course. This course will be continued as long as the gyro presentation is maintained as shown in FIG. 1. The device of this invention permits the pilot of the aircraft to fly his aircraft on a desired course without having to refer constantly to another instrument such as a compass.

When it is desired to change course, the pilot banks the aircraft in the direction of the new heading. Indicator D of the gyro presentation G accurately indicates the number of degrees of roll or bank of the aircraft, right or left. The apex 27 of the indicator D pointing to such mark 37 as shown in FIG. 2 indicates the degree of roll or bank (and in the case of FIG. 2 indicates fifteen degrees right bank). As explained hereinabove the marks 30 and 30' on the arms 25 and 25' also are used to indicate the degree of roll of the aircraft in relation to the earth's surface.

Once on a new course as indicated by any standard aircraft compass the pilot can maintain his desired course by again holding the pointer or apex 27 on the mark 21 indicating zero degrees as described in more detail hereinabove.

This angular means of gyroscopic presentation tends to magnify the attitude picture and therefore the correct amount of roll or bank is more readily discernible by the pilot.

FIG. 2 shows the horizontal bar 18 in the top half of the face 11 of the gyro presentation G. This indicates to the pilot of the aircraft that the plane is descending or is in a dive.

FIG. 3 illustrates the horizontal bar 18 in the lower half of the face 11. This indicates that the airplane is climbing.

FIGS. 4–8 illustrate a modified form of the invention which includes a simplified presentation of the banking attitude of the airplane and also a new and novel means for indicating the climb and the glide position of an airplane, as will be more fully explained. In FIGS. 4-8, the housing 110 corresponds with the housing 10 of FIGS. 1-3. A gyro A (FIGS. 6 and 7) of any conventional construction is mounted within the housing 110, as will be more fully explained, and supports in conjunction therewith an indicator plate 116 and also a horizon bar 118. The plate 116 corresponds with the plate 16 of FIGS. 1-3 and the horizon bar 118 corresponds with the horizon bar 18 of FIGS. 1-3, and preferably they are all mounted as hereinafter explained in connection with FIGS. 4-7.

As best been in FIGS. 6 and 7, the gyro A is illustrated partially in section and partially in elevation, with only the basic structure being illustrated since the gyro A is itself a conventional apparatus. Such gyro A illustrated in FIGS. 6 and 7 includes the central gyro rotor casing R in which the central rotor (not shown) is rotated by air or electricity in any known manner. The rotor casing R and the rotor encased therein are supported pivotally on a gimbal frame F which in turn is pivotally mounted on the casing or housing 110. More specifically, the rotor casing R has a pivot pin 40 which is mounted in suitable bearings 41 of the gimbal frame F. The gimbal frame F has a pivot pin 42 which is mounted in suitable bearings 43 provided on the rotor casing R. Thus the rotor casing R and the rotor encased therein are adapted to pivot with respect to the gimbal frame F about the pivot pins 40 and 42. The gimbal frame F has a pivot pin or support 45 thereon which extends into a bearing 46 formed in the housing plate 110a. The housing 110 has an extension or arm 110b which extends inwardly and holds a pivot pin 47 for supporting the gimbal frame F at a bearing 48. Thus, the gimbal frame is supported for pivotal movement about the pivotal pin 45 and 47 at a right angle to the pivot pins 40 and 42. Such mounting of the gyro apparatus A is of course standard and may be adjusted in the known manner.

The plate 116 has a bracket 116a connected on its back or rear side for receiving screws 49 to hold the plate 116 securely to the gimbal frame F. Thus, the plate 116 is adapted to pivot with the gimbal frame F. Stated differently, since the gyro mechanism A assumes a predetermined position when the rotor is rotating, as is well known, when the casing 110 is moved relatively to the gyro A, the plate 116 is held with the frame F and therefore there is a relative movement between the housing 110 and the plate 116. Such relative movement is an indication of the bank of the aircraft, as will be more fully explained.

The horizon bar 118 extends across the front of the plate 116, but is not connected thereto. The horizon bar 118 is connected to a pivoted support arm 50 which extends rearwardly to pivot pins 51 and 52. The pivot pins 51 and 52 support the arm 50 for pivotal movement of the arm 50 and the horizon bar 118 about such pins 51 and 52. A counterbalance weight 53 is mounted on the opposite end of the arm 50 from the pivots 51 and 52 to maintain a balance with the arm 50 and the horizon bar 118. The arm 50 has a longitudinal slot 50a therethrough through which a connecting rod 55 extends. Such connecting rod 55 is directly attached to the rotor casing R by any suitable securing means and is therefore movable with the rotor casing. The gimbal frame F is provided with an arcuate slot 56 through which such rod 55 extends. Therefore, when the rotor casing R moves relative to frame F, such movement is transmitted to arm 50 by the rod 55 and therefore, the rod 55 and the horizon bar 118 move together with the rotor casing R as the rotor casing R pivots about the pivot pins 40 and 42. Therefore, since the rotor casing assumes a predetermined position when in use, the arm 118 assumes a predetermined position in use, but when the casing or housing 110 and the frame F therewith are moved about the pivot pins 40 and 42, then there is a relative movement between the housing 110 and the horizon bar 118 which gives the appearance of a movement of the bar 118, as will be more fully explained.

The housing or casing 110 has a front plate or sight glass ring 110c which has a section of glass 60 mounted therein in any suitable manner. As shown in FIGS. 6 and 7, the glass 60 is held in place on the pate 110c by a retaining snap ring 61 or any other similar construction. A ring 113 is mounted inwardly of the glass 60 and it corresponds with the ring 13 of FIGS. 1-3, except that the numerals or calibrations are on the bottom half of the ring 113 whereas they are on the top half of the ring 13. Also, the ring 113 is formed with a downward extension so as to extend horizontally at 113a across the face of the presentation. The ring 113 preferably has calibrations from zero at the bottom in 15° increments both to the right and to the left from the bottom as best seen in FIGS. 4 and 5. Other increments or intervals for the calibrations or markings can of course be utilized within the scope of this invention as pointed out in connection with FIGS. 1-3.

The plate 116 is preferably colored with the upper portion 116b being gray and the lower portion 116c being black and a horizontal reference separating said upper portion 116b from said lower portion 116c. It will be appreciated, of course, that other colors may be used for the upper section 116b and the lower section 116c and they are preferably contrasting colors. The plate 116 has a pointer 116d secured thereto at the lower midportion for indicating the degree of bank of the aircraft. For this purpose, the pointer 116d is positioned inwardly of the ring 113 and is aligned with the zero mark or indication on such ring 113 when the aircraft is in level or horizontal flight. Normally, the apparatus of this invention is mounted on a panel of the aircraft, a portion of which is illustrated in FIGS. 6 and 7 at 63. Such panel is positioned for viewing by the pilot and the front cover 110c is therefore visible on the panel while the rest of the casing 110 is behind such panel 63. The screws 60a serve to hold the front cover 110c on the panel 63 and to also connect the housing cover 110c to the rest of the housing or casing 110. Therefore, when the aircraft banks, the front plate 110c banks with the aircraft. Since the plate 116 is connected with the gyro apparatus A, such plate 116 does not move with the aircraft and therefore it serves as a fixed reference point. Thus, if the airplane banks to the left, the casing 110c as viewed in FIGS. 4 and 5 would rotate counterclockwise and the amount of the bank would be indicated by the pointer 116d oposite the calibrations on the left of the zero indication. Thus, if there is a left bank of 15°, the pointer 116d will be opposite the numeral 15 to the left of the zero mark. If the bank is to the right, the pointer 116d is opposite the indication or mark in the amount of the degrees to the right of the zero indication or mark. Thus, if there is a 30° bank to the right, the pointer 116d would be opposite the numeral 30 to the right of the zero mark.

The form of the invention shown in FIGS. 4-8 also includes a new and novel means for indicating the maximum safe climb and glide positions to the pilot. Such apparatus is designated generally with the letter B. The pitch indicating apparatus B includes a stationary scale 65. The scale 65 is attached by adhesive or by any other suitable attaching means at its upper end to the extension 110e of the face plate or dial plate 110c. As shown in the drawings, the scale 65 includes parallel rods 65a and 65b which are preferably joined together at their lower ends to form a point 65c. The parallel scale elements 65a and 65b preferably have corresponding indicator marks 66, 67 and 68. The indicator marks 66 are for indicating level flight, as will be explained, while the indicator marks 68 are for indicating the maximum safe amount of climb of the aircraft, and the indicator marks 67 are for indicating the maximum safe amount of descent or glide of the aircraft, as will be more evident hereinafter. A movable marker 75 is provided in conjunction with the fixed scale 65. Such marker 75 has a lower horizontal bar 76 which is adapted to be positioned opposite the marks 66, 67 and 68. A lower central indicating pin 76a is also provided in between the elements 65a and 65b of the scale 65. The bar 76, the pin 76a, and the scale marks 66, 67 and 68 are preferably made of a relatively bright color such as red or yellow so that they stand out prominently against the background of the plate 116. The rest of the movable marker 75 is preferably gray or some other color which blends into the background of the upper section 116b of the plate 116. Therefore, the bar 76 will be the most prominent part of the indicator in conjunction with the marks 66, 67 and 68.

The movable marker 75 may be moved upwardly and downwardly by any suitable mechanism, and one preferred form of such mechanism is illustrated in FIGS. 7 and 8 in particular. Thus, the upper end of the marker 75 is formed with spaced projections 75a and 75b. The inner longitudinal edge 75c of the projection 75a is formed with gear teeth so as to form a gear rack which meshes with a gear 77. The gear 77 is mounted on a shaft 78 which extends through the extension 110e or any other suitable support. Such shaft 78 also carries a pair of flexible clutch plates 79 which have a clutch drive wheel 80 positioned therebetween. The clutch drive wheel 80 is mounted on a shaft 81 which extends through the plate 110c for operation by a knob 82 on the face of the plate 110c.

Upon a rotation of the knob 82, the drive plate 80 imparts rotation through frictional contact with the clutch plates 79 to the gear 77. The rotation of the gear 77 effects an upward or downward movement of the marker 75, depending upon the direction of rotation of such gears 77. When the marker 75 reaches its upward limit of travel with the bar 76 in alignment wth the scale marks 67 (FIG. 4) the clutch 80 may continue to rotate but will slip with respect to the clutch plates 79 so that no further upward movement of the movable marker 75 is obtained. Likewise, when the marker 75 is moved in the downward direction, the marker 75 is stopped when the bar 76 is in alignment with the indicator marks 68. At that time, if the knob 82 is continued in its rotation, the clutch plate 80 will slip with respect to the clutch plates 79 and will not damage the driving connection between the gear 77 and the gear rack 75c.

In the operation or use of the form of the invention shown in FIGS. 4–8, for indicating the maximum safe climb of the aircraft, the marker 75 is moved downwardly by rotation of the knob 82 so as to position the bar 76 in alignment with the lower indicator marks 68 (FIG. 8). Then as the nose of the airplane rises in the climb, the horizon bar 118 will appear to move downwardly from its central position in alignment with the mark 66 to the intermediate position shown in FIG. 4 and ultimately when the airplane or aircraft has reached its desired maximum climb pitch, the horizon bar 118 will be in alignment behind the indicator bar 76 at mark 68. This will indicate to the operator that the aircraft is at its maximum safe climb pitch.

If the maximum safe descent or glide pitch is to be indicated, the knob 82 is turned to move the marker 75 upwardly until the bar 76 is opposite the marks 67 (FIG. 5). Then, the aircraft is directed downwardly until the bar 76 is in alignment with the horizon bar 118 which will indicate to the pilot that the aircraft is in its maximum safe descent or glide pitch.

It will be appreciated that additional marks besides the marks 66, 67 and 68 may be employed for intermediate positions. Also, the marks 67 and 68 may indicate climb and glide attitudes other than the maximum safe climb and glide attitudes as previously pointed out. It should be noted that the indicator marks 66 are for indicating level flight of the aircraft so that when the bar 76 is in alignment with the indicator marks 66 and the indicator bar 118 is then behind the bar 76, the pilot knows that the aircraft is on a level flight.

It will also be appreciated that a combination of climb and bank may occur in which case the pointed 116d will indicate the degree of bank and the central pin 76a will serve as the point at which the horizon bar 118 is brought into alignment for the correct climb or glide pitch.

It can be appreciated that this invention presents an entirely new concept in directional indication in aircraft, and represents a marked stride in aircraft instruments.

The foregoing disclosure and description of the invention is illustrative and explanatory thereof and various changes in the size, shape and materials, as well as in the details of the illustrated presentation, may be made within the scope of the appended claims without departing from the spirit of the invention.

What is claimed is:

1. A gyro apparatus for indicating rotational movement of an aircraft about its longitudinal axis including, a gyroscope adapted to maintain a predetermined position, indicator means connected to said gyroscope for indicating the real horizon, an instrument face, said face having numerically designated calibrations thereon to indicate rotational movement of the aircraft about its longitudinal axis, arms connected to said gyroscope to move in a plane parallel to said calibrations to indicate the rotational movement of the aircraft about its longitudinal axis, arms connected to said gyroscope to move in a plane parallel to said calibrations to indicate the rotational movement of the aircraft about its longitudinal axis in relation to said calibrations, said arms being connected to each other adjacent said calibrations and diverging therefrom and in the same plane, a visual representation of a cross on said instrument face, said cross simulating the aircraft and being in fixed relationship with said instrument face, said cross having a body and a cross arm, said body depending downwardly and in the same visual plane as said arms, and marks on said diverging arms to visually indicate the relationship of said diverging arms to said cross as an indication of the amount of aircraft roll.

2. A gyro apparatus for indicating rotational movement in an aircraft about its longitudinal axis including, a gyroscope adapted to maintain a predetermined position, an instrument face, said face having numerically designated calibrations thereon to indicate rotational movement of the aircraft, a reference line connected to said gyroscope and extending across said instrument face for indicating the real horizon, arms connected to said gyroscope to move in a plane parallel to said calibrations to indicate the rotational movement of the aircraft in relation to said calibrations, said arms being connected to each other adjacent said calibrations and diverging therefrom and in the same plane, a visual representation of a cross which simulates the aircraft and is in fixed relationship with said instrument face, said cross having a body and a cross arm, said body depending downwardly from the top of said face to said horizontal line to indicate the rotational movement of said aircraft in relation to said cross, and marks on said arms to visually indicate the relationship of said arms to said cross as an indication of the amount of aircraft roll.

3. An indicator apparatus for aircraft, comprising a housing adapted to be connected to an aircraft, an instrument face on said housing, a horizon bar visible at said instrument face and having connections with a gyro mechanism for holding said horizon bar in a predetermined position as the aircraft moves, a longitudinal scale secured to said housing and depending downwardly from the top of said instrument face, and said scale having a pair of parallel arms joined together at the lower end thereof to form an opening therebetween and having level flight, climb and glide indicator marks calibrated thereon, a movable marker member having a lateral bar therewith extending perpendicularly from said scale in a plane parallel to said parallel scale arms, and means for moving said marker member longitudinally relative to said scale to locate the lateral bar opposite a selected mark on said scale whereby alignment of said lateral bar and said horizon bar indicates the pitch of the aircraft.

References Cited by the Examiner
UNITED STATES PATENTS

| | | | |
|---|---|---|---|
| 2,027,808 | 1/36 | Carlson | 33—204.2 |
| 2,059,266 | 11/36 | Nesbitt | 33—204.2 |
| 2,183,133 | 12/39 | Carter | 33—204.2 |
| 2,404,603 | 7/46 | Summers | 33—204.2 |
| 2,492,992 | 1/50 | Handel | 33—204.2 |

ROBERT B. HULL, *Primary Examiner.*